United States Patent [19]

Jackson et al.

[11] Patent Number: 4,479,377
[45] Date of Patent: Oct. 30, 1984

[54] METHOD AND APPARATUS FOR MEASURING GAS FLOW

[75] Inventors: George R. Jackson, Doylestown; Donald C. Frick, Levittown, both of Pa.

[73] Assignee: Arcstart, Inc., Oakford, Pa.

[21] Appl. No.: 478,319

[22] Filed: Mar. 24, 1983

[51] Int. Cl.³ .......................... G01F 1/22; G01F 25/00
[52] U.S. Cl. ...................................... 73/3; 73/861.54; 138/31
[58] Field of Search ......................... 73/3, 215, 861.54; 138/31; 222/3, 387, 388

[56] References Cited

U.S. PATENT DOCUMENTS

| | | | |
|---|---|---|---|
| 710,889 | 10/1902 | Prescott | 222/3 |
| 1,238,498 | 2/1915 | Dawley | 73/861.54 |
| 3,125,879 | 3/1964 | Porter, Jr. | 73/3 |
| 4,307,601 | 12/1981 | Jackson | 73/3 |
| 4,403,629 | 9/1983 | Vries | 138/31 |

Primary Examiner—Herbert Goldstein
Attorney, Agent, or Firm—Louis Weinstein

[57] ABSTRACT

A movable piston is arranged within an open-ended cylinder, the piston having a peripheral groove for receiving liquid mercury to create a sliding gas-tight seal between the piston and the cylinder. The cylinder wall is provided with a plurality of openings, arranged to prevent mercury from escaping through said openings while permitting gas introduced into the interior of the cylinder to escape therefrom. When the piston reaches an equilibrium condition, the height of the piston represents the gas flow rate, which is determined by the flow rates through the total number of openings beneath the sliding seal. As an alternative embodiment, the flow rate is controlled by a downwardly moving piston. As another alternative embodiment, the piston is free to move up or down to compensate for fluctuations in pressure and/or flow rate within the cylinder.

23 Claims, 2 Drawing Figures

METHOD AND APPARATUS FOR MEASURING GAS FLOW

FIELD OF THE INVENTION

The present invention relates to flow rate measuring devices and more particularly, to a novel and yet highly simplified flow rate apparatus for measuring flow rate and calibrating flow meters through the use of a cylinder/piston apparatus and in which the need for expensive position encoders or other complex electronic devices is avoided.

BACKGROUND OF THE INVENTION

Flow rate measurement devices are well-known in the prior art. One successful flow rate device is disclosed in U.S. Pat. No. 3,125,879, issued Mar. 24, 1964, describes a flow rate measuring apparatus comprised of a piston mounted for slidable movement within a cylinder. The piston is provided with an annular groove for receiving liquid mercury, which provides a gas-tight sliding seal between the piston and the cylinder. Air introduced into the interior of the cylinder causes the piston to be raised. After the piston begins to move upwardly, an intricate and complicated mechanism measures the time it takes for the piston to move from a starting position to the upper position, to determine volume and/or flow rate.

Flow meter testing and calibration apparatus described in U.S. Pat. No. 3,125,879, issued Mar. 24, 1964, comprises a piston slidably mounted within a hollow cylinder which receives the gas flow passing through the device under test, said gas flow filling the hollow container and causing the piston to rise. Apparatus for detecting the movement of the piston past a starting point and a termination point, respectively, initiates and terminates a timer so that, with prior knowledge of the volume of the cylinder, the elapsed time required for the piston to move between these two points, yields a flow rate. The sliding seal, which is described in U.S. Pat. No. 2,927,829, issued Mar. 8, 1960, comprises a liquid mercury seal arranged within an annular group provided in the piston which makes wiping contact with the interior surfaces of the container.

The complications in the equipment design and the use of the equipment described hereinabove, and the inaccuracies in the readings developed by the equipment due to inherent shortcomings in the equipment design, which requires a significant amount of human intervention during the test, leads to attendant human error.

The prior art sensing devices utilized to detect movement of the piston past the starting and termination points comprise a light source and light-sensitive element which detect the presence of the liquid mercury seal as it passes the light source and reflects the light to the light-sensitive element. Limitations on the flow rate readings result from the lack of flexibility of positioning the sensor devices. In addition, the apparatus described in the aforementioned prior art patents cannot provide a plurality of flow rate readings at closely spaced intervals between the starting and termination points.

The shortcomings of the aforementioned prior art lead to the apparatus disclosed in U.S. Pat. No. 4,307,601, and issued Dec. 29, 1981, to the patentee of the present invention. The apparatus in the last mentioned patent utilizes a precision encoder device driven by a metallic tape coupled to the movable piston, the linear movement of the piston being converted to angular movement for conversion into a digital output by the encoder, representing shaft angle. The aforementioned tape passes over an encoder drive disk and is coupled at one end to the aforementioned sliding piston and at its opposite end to a counter-balancing weight.

The apparatus described in U.S. Pat. No. 4,307,601 necessitates the use of an accurate encoder and associated electronics. Although the results are satisfactory using such equipment, such electronic equipment is expensive.

BRIEF DESCRIPTION OF THE INVENTION

This invention is characterized by providing a flow rate meter having accuracy and sensitivity equivalent to the apparatus described in U.S. Pat. Nos. 4,307,601, 2,927,829 and 3,125,879, and yet is of an extremely simplified design, which makes the equipment easy to use and which provides accuracy commensurate with prior art devices, while avoiding all of their disadvantages.

The present invention provides for accurate flow rate measurements through the use of novel apparatus comprising a hollow cylinder and a piston slidably mounted within said cylinder and having an annular groove receiving a liquid, preferably mercury, creating a sliding gas-tight seal between the piston and the cylinder. The gaseous flow is introduced into the cylinder, preferably through the closed bottom of said cylinder, causing the hollow region defined by the portion of said hollow cylinder beneath said piston which receives said fluid to be filled with gas.

The cylinder is provided with a plurality of openings in a predetermined arrangement, which openings permit the flow of the fluid therethrough, while at the same time being of a diameter insufficient to permit egress of the mercury therethrough.

Flow rate is established by counting the number of holes in the cylinder beneath the said sliding seal, once the piston reaches a state of equilibrium. A determination of the flow rate may be simplified by providing a graduated scale along the exterior surface of the cylinder. Since a predetermined number of openings are provided in said cylinder per graduation, the total number of graduations of said scale beneath said sliding seal times the number of per graduation provides a count of the total number of openings. Since all the openings preferably have a uniform diameter, the total area of said openings is also established directly from the number of graduations beneath the sliding liquid seal. This arrangement totally avoids the need for electronic and eletro-optical apparatus utilizing the prior art devices while, at the same time, providing a greatly simplified method and apparatus for easily and rapidly determining flow rate.

In another embodiment, the flow through the openings is closed off and the cylinder is filled with gas to bring the piston to the top of the cylinder. The gas source conduit is then closed, the conduit coupled to the cylinder openings is opened, and the cylinder is allowed to fall by gravity. The number of openings determines the flow rate. The reading of the flow meter under test is compared against this flow rate.

In still another embodiment, the flow from the gas source is maintained as the gas exits through the flow openings, which are located beneath the piston, which is free to move to compensate for internal pressure and/or flow rate changes.

OBJECTS OF THE INVENTION AND BRIEF DESCRIPTION OF THE FIGURES

It is, therefore, one object of the present invention to provide a novel method and apparatus for accurately measuring flow rate utilizing a piston slidably mounted within a hollow cylinder and having an annular groove for receiving a liquid providing a gas-tight sliding seal between the piston and the cylinder, which cylinder is further provided with flow openings to permit egress of a gaseous fluid therethrough, while prohibiting passage therethrough of the liquid providing the gas-tight sliding seal, whereupon a flow rate is established when the piston reaches a state of equilibrium based upon the flow rate of the flow introduced into the cylinder.

The above, as well as other objects of the present invention, will become apparent when reading the accompanying description in which.

DETAILED DESCRIPTION OF THE INVENTION AND THE PREFERRED EMBODIMENTS THEREOF

Figure 1:
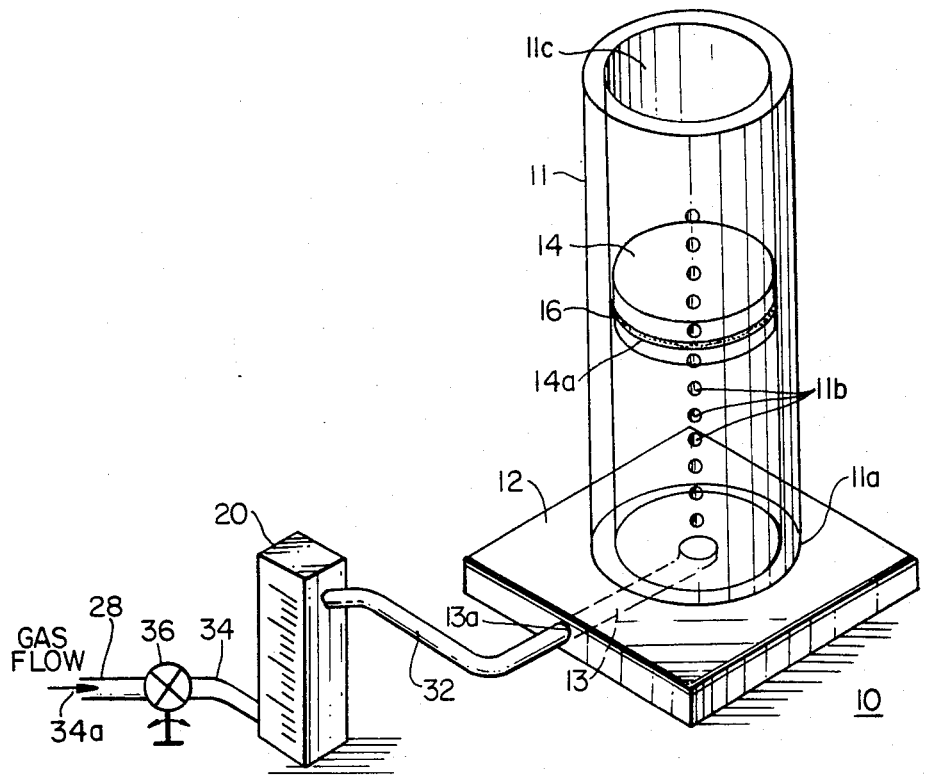
FIG. 1 shows a perspective view of flow rate measurement apparatus designed in accordance with the principles of the present invention.

FIG. 1 shows a flow rate measurement apparatus (10) embodying the principles of the present invention and being comprised of a transparent cylindrical housing (11) arranged upon a supporting member (12) provided with gas inlet (13) whose opening (13a) is coupled through conduit means (32) and (34) to a flow meter (20) under test and to a gas source (not shown) coupled to opening (34a) for the purpose of introducing a gas flow, whose flow rate is to be measured. If desired, the support (12) may be omitted and the inlet conduit may be placed along the wall of cylinder (11), having a closed bottom end. Cylinder (11) is preferably a hollow transparent member positioned on platform (12) and having a gas-tight seal provided between the surface of platform (12) and the lower edge (11a) of cylinder (11) to prevent gas from escaping at this interface.

A cylindrical-shaped piston (14) is slidably mounted within cylinder (11). Piston (14) has an outer diameter which is just slightly less than the inner diameter of cylinder (11) and is provided with an annular groove (14a) for receiving a liquid, preferably mercury, which provides a sliding gas-tight seal (16). The clearance between the outer diameter of piston (14) and the inner diameter of cylinder (11) and the manner and amount of liquid mercury provided within groove (14a) to assure suitable sliding gas-tight liquid seal (16) may be selected in accordance with the teachings of U.S. Pat. No. 2,927,829, issued Mar. 8, 1960, and referred to hereinabove. The manner in which liquid mercury is introduced into the groove (14a) may also be utilized in accordance with the teachings of U.S. Pat. No. 2,927,829, although other satisfactory methods may be employed, if desired.

The sliding liquid seal (16) causes piston (14) to experience an extremely small frictional force in moving either up or down within cylinder (12), while at the same time providing an excellent gas-tight seal between piston (14) and cylinder (12).

The upper end of cylinder (11) is open at (11c), exposing the upper surface of piston (14) to atmospheric pressure.

Transparent cylinder (11) is provided with a plurality of flow openings (11b), preferably of uniform diameter, all of said openings being sufficiently small to prevent mercury from flowing through said openings (11b).

If desired, a counterweight of the type shown in U.S. Pat. No. 4,307,601 may be coupled to piston (11).

The apparatus (10) of FIG. 1 may be utilized to measure flow rates or to calibrate flow meters and may include a suitable gas source (not shown) having a first conduit (28) coupled between gas source coupled through conduit (34) to the flow meter (20) under test.

Tests may be performed as follows:

The cylinder (11) is evacuated, such as for example, by coupling conduit (32) to atmospheric pressure and allowing piston (14) to drop to the surface (12). The flow from the gas source is then introduced into the cylinder (11) by opening valve (36) to begin the test. The gas source may have an unknown flow rate or the gas source may be a source whose flow rate is known and is greater than the flow rate of the flow meter (20) connected between the gas source (not shown) and cylinder (11). Gas under pressure from the gas source passes through conduit (34), valve (36), flow meter (20) and conduit (32) and enters into the interior of cylinder (11) through conduit (13), causing piston (14) to be lifted. Piston (14) continues to rise until the number of openings (11b) in the wall of cylinder (11) allows the egress of gas under pressure to an amount sufficient to balance the flow rate entering into cylinder (11), at which time piston (14) reaches a state of equilibrium. The number of openings may be counted or flow rate may be read directly by reference to the graduated scale (not shown) provided along one side of flow openings (11b), the graduation immediately beneath the sliding seal (16) establishing the number of openings (11b) uncovered. Based upon the particular pattern of openings (11b) arranged upon the wall of cylinder (11), the appropriate graduation may be associated with a number converting the number of openings into a flow rate. As one example, a previously calibrated flow rate meter may be coupled to the apparatus and the graduation immediately beneath the sliding seal (16) is observed when piston (14) reaches the state of equilibrium. Using this as a standard value, flow meters under test deviating therefrom will cause displacement of the sliding seal from said standard graduation. For example, if the flow rate meter under test has a greater flow rate than the standard, piston (14) will reach equilibrium at a greater height. Conversely, if the flow rate meter under test has a flow rate less than the standard flow rate meter, the piston (14) will reach equilibrium at a lower height. These values can be read off directly as flow rates. The test is primarily used to accurately calibrate the flow meter (20) under test.

The arrangement of openings (11b) may be uniformly arranged as shown in FIG. 1, with openings (11b) being arranged on an imaginary vertical line and having uniformly spaced centerline to centerline intervals between adjacent openings. The openings may be alternatively arranged about cylinder (11) in a helical manner.

The openings (11b) may also be arranged at nonuniformly spaced intervals, with the adjacent openings being closer to one another near the bottom of said cylinder (11) and/or may be arranged at intervals of gradually increasing dimension in moving from the bottom cylinder (11) upwardly. Conversely, the openings may be arranged so that the intervals between the adjacent openings are large near the bottom of said cylinder and are increasingly smaller in moving from the bottom of cylinder (11) towards the top. Obviously, other arrangements may be employed. Also, the openings may vary in diameter, if desired.

In each of the flow opening arrangements described above, a graduated scale (not shown) may be designed to provide a direct reading of flow rate from the apparatus (10) without performing an unnecessary conversion, said flow rate reading being commensurate with the flow hole pattern provided.

Figure 2:
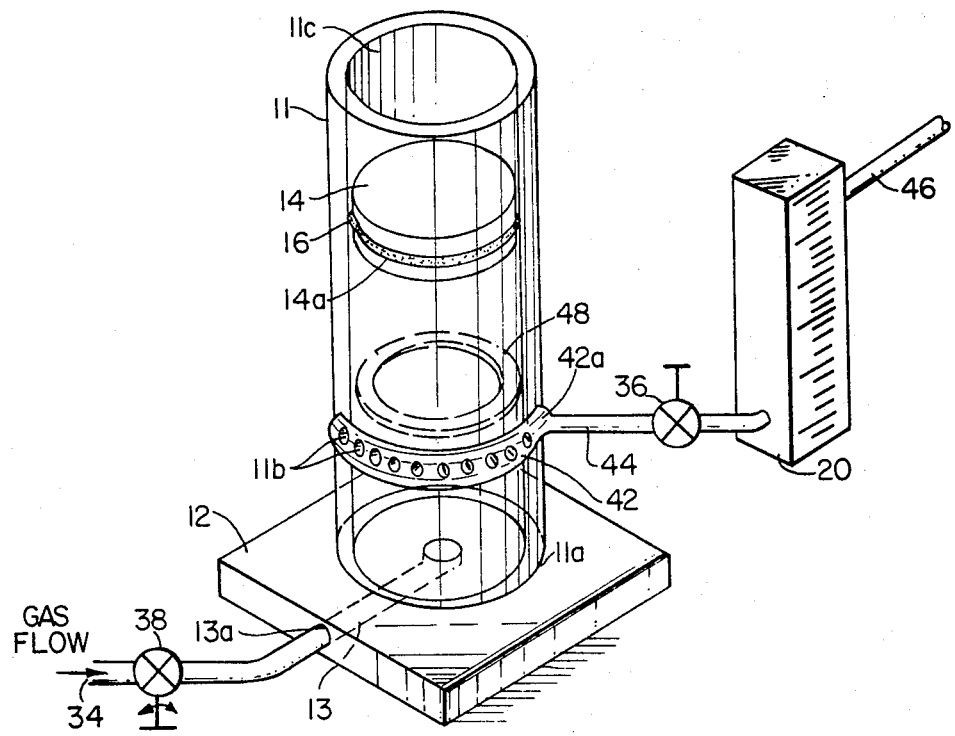
FIG. 2 shows a perspective view of another preferred embodiment of the invention employing the concepts embodied in the apparatus of FIG. 1.

The embodiment (40) shown in FIG. 2, in which like elements are designated by like numerals is provided with flow openings (11b) arranged about an imaginary circle or portion thereof, a hollow substantially toroidal-shaped enclosure or manifold (42) receives the gas flow exiting through flow openings (11b) and delivers the resulting flow to conduit (44). Flow meter (20) under test is coupled between conduits (44 and 46). The free end of conduit (46) is open to allow the gas flow to exit from the apparatus (40).

The operation of apparatus (40) is as follows:

Valve (36) is closed and valve (38) is opened, allowing gas from the gas source (not shown) to enter cylinder (11), lifting piston (14). When the piston (14) reaches the top of cylinder (11), valve (38) is closed and valve (36) is opened.

Piston (14) is thus free to move down due to its own weight. Gas in cylinder (11) exits through flow openings (11b) and is collected by manifold (42), and is delivered to flow meter (20) and passes into the atmosphere through conduit (46).

The flow rate through the flow meter (20) is the sum of the flow rates through flow openings (11b). The reading of flow meter (20) is compared with the known flow rate and the flow meter (20) is adjusted to yield the correct reading.

The number and size of the flow openings (11b) are selected to obtain the desired flow rate. Also, the weight of piston (14) is selected to obtain the desired flow rate.

The openings (11b) may be selectively sealed to alter the flow rate, if desired.

The apparatus (40) does not require a gas source. A flow meter (20) may be tested using air. The operation is the same as that described above, with the gas source omitted and the piston lifted with valve (38) open and valve (36) closed. With the piston at the top of cylinder (11), valve (38) is closed and valve (36) is opened to begin the test of flow meter (20).

The openings (11b) may be large enough to permit mercury to escape. To prevent this, the interior of cylinder (11) may be provided with a ledge or stop (48) to prevent the sliding seal (16) from moving into alignment with openings (11b).

The apparatus (40) of FIG. 2 can be used as a flow regulator by leaving both valves (38) and (36) open. Piston (14), arranged above openings (11b), is free to move up and down due to pressure and/or flow rate fluctuations, assuring a constant flow rate. Readings may be taken, even when piston (14) is moving up or down.

As can be seen from the foregoing description, the present invention provides a simple and yet accurate arrangement for measuring volume and/or flow rate, either of an unknown gas source or of a flow rate meter, while avoiding the need for complex electronics used in the prior art patents referred to hereinabove.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A device for flow calibration comprising:
   a hollow cylinder closed at its base and having an open upper end;
   said cylinder having an entry opening for admitting gas under pressure;
   a piston slidably mounted within said cylinder and movable up or down in accordance with the pressure of the gas admitted into said cylinder;
   liquid sealing means for providing a gas-tight sliding seal between the annular periphery of said piston and the inner surface of said cylinder;
   said liquid sealing means including a sealing liquid maintained between the adjacent surfaces of said piston and said cylinder;
   said cylinder having flow openings of known size arranged about said cylinder to permit gas admitted through said entry opening to exit through said flow openings;
   said openings being sufficiently small to prevent the egress of said sealing liquid therethrough;
   the gas under pressure entering the region beneath said piston and causing said piston to move, the number of flow openings expelling gas being utilized for measurement purposes.

2. The device of claim 1, wherein the periphery of said piston is provided with an annular groove to receive said sealing liquid.

3. The device of claim 2, wherein said sealing liquid is mercury.

4. The device of claim 1, wherein said gas under pressure is derived from a gas source;
   a flow meter to be calibrated being coupled between said gas source and said entry opening.

5. The device of claim 1, wherein the flow openings are of uniform diameter.

6. The device of claim 1, wherein the flow rate is determined when the piston reaches a state of equilibrium by the number of flow openings beneath said liquid sealing means, which are expelling gas from the interior of said cylinder.

7. The device of claim 1, further comprising manifold means for receiving the gas flow exiting through all of said flow openings and delivering the total flow to an outlet conduit.

8. The device of claim 7, wherein said flow openings are arranged to lie substantially in a horizontal plane;
   means for closing the entry opening when the gas in said cylinder has lifted the liquid sealing means above said flow openings, whereby downward movement of the piston urges the gas in said cylinder to exit through said flow openings.

9. The device of claim 8, further comprising valve means for selectively coupling said manifold means to the flow meter under test for raising the piston above said flow openings, when said valve is closed.

10. The device of claim 5, further comprising conduit means for coupling the flow meter to be tested between said gas source and said entry opening.

11. A flow calibration device comprising:
a hollow cylinder closed at its base and having an open upper end;
said cylinder having an entry opening for admitting gas under pressure;
a piston slidably mounted within said cylinder and movable up or down in accordance with the pressure and/or flow rate of the gas admitted into said cylinder;
liquid sealing means for providing a gastight sliding seal between the annular periphery of said piston and the inner surface of said cylinder;
said liquid sealing means including a sealing liquid maintained between the adjacent surfaces of said piston and said cylinder;
said cylinder having flow openings of known diameter arranged about said cylinder to permit gas admitted through said entry opening to exit through said flow openings;
said gas under pressure entering the region beneath said piston and causing said piston to move, the number of flow openings expelling gas being utilized for measurement purposes;
valve means for selectively coupling a gas source to the entry opening;
manifold means receiving the gas flow from all of said flow openings for delivering the total gas flow to a flow meter under test;
said cylinder including liquid containment means for preventing the liquid sealing means from exiting through said flow openings.

12. The device of claim 11, wherein said liquid containment means comprises a stop means for preventing the piston from moving below a predetermined height in said cylinder to prevent the liquid sealing means from being aligned with any of said flow openings.

13. The device of claim 11, wherein a gas source is coupled to said inlet opening and a flow meter is coupled to the outlet of said manifold means;
said piston being positioned above said flow openings and being free to move up or down to compensate for pressure and/or flow rate fluctuations, to permit performance of a flow meter test, even during such fluctuations.

14. The device of claim 11, including means for closing said entry opening when the piston is raised to the top of said cylinder, whereby the gas in said cylinder is caused to exit through said flow openings at a substantially constant rate, as the weight of said piston causes the piston to move downwardly in said cylinder.

15. The device of claim 14, wherein a flow meter is coupled to the outlet of said manifold means.

16. A method for calibrating a flow meter using a flow regulator comprising a cylinder having flow openings communicating with the cylinder interior and having a piston slidably mounted in said cylinder and provided with a liquid sealing means about the piston periphery for providing a gas-tight sliding seal between the movable piston and the cylinder, said method comprising the steps of:
introducing gas into the cylinder in a quantity sufficient to lift the piston to a predetermined location above the flow openings;
thereafter allowing the piston to move downwardly, due to the force of gravity, forcing the gas in said cylinder to pass through each of the flow openings at a known predetermined flow rate;
collecting the gas flow from all of said flow openings and conveying the total flow to the flow meter under test;
comparing the flow rate reading of the flow meter under test against the known flow rate to facilitate adjustment of flow meter calibration.

17. The method of claim 16, further comprising the step of limiting downward movement of the piston to prevent the liquid of said liquid sealing means from escaping through said flow openings.

18. The method of claim 16, further comprising the step of limiting the maximum diameter of said flow openings to prevent the liquid of said liquid sealing means from escaping through said flow openings.

19. A method for calibrating a flow meter using a flow regulator comprising a cylinder having flow openings communicating with the cylinder interior and having a piston slidably mounted in said cylinder and provided with a liquid sealing means about the piston periphery for providing a gas-tight sliding seal between the movable piston and the cylinder, said method comprising the steps of:
introducing gas into said cylinder to lift said piston to a location above all of said flow openings;
blocking the flow of gas through said flow openings until said piston reaches the aforesaid location;
thereafter allowing the gas to exit through each of said openings at a predetermined flow rate;
accumulating the gas flow from said flow openings and delivering the resultant gas flow to a flow meter under test;
said constant flow rate being maintained, either by upward or downward movement of said piston responsive to pressure fluctuations of the gas in said cylinder;
comparing the flow meter reading against the known flow rate to facilitate flow meter calibration.

20. The method of claim 19, further comprising the step of preventing the piston from dropping below a predetermined height, to prevent the liquid of said liquid sealing means from escaping through said flow openings.

21. The method of claim 18, further comprising the step of limiting the maximum diameter of a said flow openings to prevent the liquid of said liquid sealing means from escaping through said flow openings.

22. A method for testing a flow meter using a flow regulator comprising a cylinder having flow openings communicating with the cylinder interior and having a piston slidably mounted in said cylinder and provided with a liquid sealing means about the piston periphery for providing a gas-tight sliding seal between the movable piston and the cylinder, said method comprising the steps of:
passing a gas through a flow meter to be tested;
coupling the gas flow leaving said flow meter to said cylinder, causing said piston to be raised above said flow openings to allow escape of gas in the cylinder at a constant predetermined rate through each flow opening;
observing the number of flow openings beneath said liquid sealing means when the piston reaches a state of equilibrium, to establish the resultant flow rate; and
comparing the known resultant flow rate with the flow meter reading to facilitate calibration of the flow meter.

23. The method of claim 22, further comprising the step of limiting the maximum diameter of said flow openings to a predetermined size, to prevent the liquid of said liquid sealing means from escaping through said flow openings.

* * * * *